United States Patent
Nomura et al.

[11] Patent Number: 5,738,885
[45] Date of Patent: Apr. 14, 1998

[54] DIE ASSEMBLY FOR MOLDING CYLINDRICAL BODY AND CYLINDRICAL BODY PRODUCED USING SAME

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 534,403

[22] Filed: Sep. 27, 1995

[30] Foreign Application Priority Data

Sep. 29, 1994 [JP] Japan .................................. 6-235212

[51] Int. Cl.⁶ .................................................. B29C 45/26
[52] U.S. Cl. ........................... 425/577; 249/59; 249/184; 425/DIG. 10
[58] Field of Search ........................ 425/577, 412, 425/414, 190, 192, 183, DIG. 58, DIG. 30, DIG. 247, 441, 443; 249/59, 144, 152, 184, 186

[56] References Cited

U.S. PATENT DOCUMENTS

| | | | |
|---|---|---|---|
| 2,733,495 | 2/1956 | Lucas | 249/152 |
| 3,756,553 | 9/1973 | Ranj | 249/184 |
| 4,299,371 | 11/1981 | Duga | 249/59 |
| 4,378,928 | 4/1983 | Kopp et al. | 249/184 |
| 4,383,819 | 5/1983 | Letica | 425/577 |
| 4,541,605 | 9/1985 | Kubota et al. | 249/59 |
| 4,765,585 | 8/1988 | Wieder | 425/192 R |
| 4,832,307 | 5/1989 | Watanabe et al. | 249/152 |
| 5,144,493 | 9/1992 | Nomura | 359/700 |

FOREIGN PATENT DOCUMENTS 746411  11/1966  Canada .................................. 249/59

*Primary Examiner*—Khanh P. Nguyen
*Attorney, Agent, or Firm*—Greenblum & Bernstein, P.L.C.

[57] ABSTRACT

A molding die assembly includes an outer molding die which forms an outer peripheral surface of a cylindrical mold, and, an inner molding die which forms an inner peripheral surface of the cylindrical mold, wherein the outer molding die is comprised of a plurality of split die elements which are split at an oblique separating surface inclined with respect to the circumferential and axial directions of the cylindrical mold.

5 Claims, 7 Drawing Sheets

DIE ASSEMBLY FOR MOLDING CYLINDRICAL BODY AND CYLINDRICAL BODY PRODUCED USING SAME

BACKGROUND OF THE INVENTION

1. Field of the Invention

The present invention relates to a die assembly for molding a cylindrical body, such as a movable lens barrel or the like, and also relates to the cylindrical body produced by the molding die assembly.

2. Description of Related Art

A cylindrical body, for instance, of which a zoom lens barrel for a zoom lens camera is made, is molded by an injection molding process using a die assembly. In this case, the finished molded product (i.e. the cylindrical body) has a parting line which appears on the outer peripheral surface thereof. In general, this parting line, which corresponds to a connecting line between a plurality of split dies, extends in a direction parallel with the optical axis of the lens barrel.

In the case where the cylindrical body is used for a movable lens barrel having a parting line of a certain height extending parallel with the optical axis, a light intercepting member, which optically intercepts light in a gap between the movable lens barrel and an outer ring provided on the outer peripheral surface thereof can be partly deformed or deflected by the parting line, thus resulting in the formation of a clearance between the movable lens barrel and the outer ring. Since the parting line extends in a direction parallel with the optical axis, as mentioned above, the clearance caused by the deformation or deflection of the light intercepting member continuously extends in the optical axis direction. In this state, if light is made incident upon the lens barrel from the front, the light partly passes through the clearance into the lens barrel. This would have an adverse influence on the photographing efficiency.

SUMMARY OF THE INVENTION

The primary object of the present invention is to provide a molding die assembly for producing a cylindrical body, in which light can be intercepted in the gap between the cylindrical body and an outer or inner ring.

Another object of the present invention is to provide a cylindrical body in which a gap between the same and an outer or inner ring can be optically interrupted.

To achieve the object mentioned above, according to an aspect of the present invention, there is provided a molding die assembly for molding a cylindrical article (mold) including an outer molding die which forms an outer peripheral surface of the cylindrical mold and an inner molding die which forms an inner peripheral surface of the cylindrical mold. The outer molding die includes a plurality of split die elements which are split at an oblique separating surface which is inclined with respect to the circumferential and axial directions of the cylindrical mold.

According to another aspect of the present invention, there is provided a molding die assembly for molding a molded article having an outer peripheral surface including a plurality of split die elements which form the outer peripheral surface of the mold, an oblique separating surface which is provided with each of the split die elements, and the split die elements forming an inner cylindrical shape when they are connected at the oblique separating surface. The oblique separating surface may be inclined with respect to the circumferential and axial directions of the mold, and the inner cylindrical shape may be the same as the outer cylindrical shape.

According to still another aspect of the present invention, there is provided a molding including a cylindrical body made from a synthetic resin mold having an outer peripheral surface and a parting line which is inclined with respect to the circumferential and axial directions and which is produced on the outer peripheral surface upon molding the cylindrical body.

According to another aspect of the present invention, there is provided a molding including a cylindrical body, made from a synthetic resin mold, having an inner peripheral surface, and a parting line which is inclined with respect to the circumferential and axial directions and which is produced on said inner peripheral surface upon molding the cylindrical body.

BRIEF DESCRIPTION OF THE DRAWINGS

The invention will be described below in detail with reference to the accompanying drawings, in which.

DESCRIPTION OF THE PREFERRED EMBODIMENT

Figure 5:
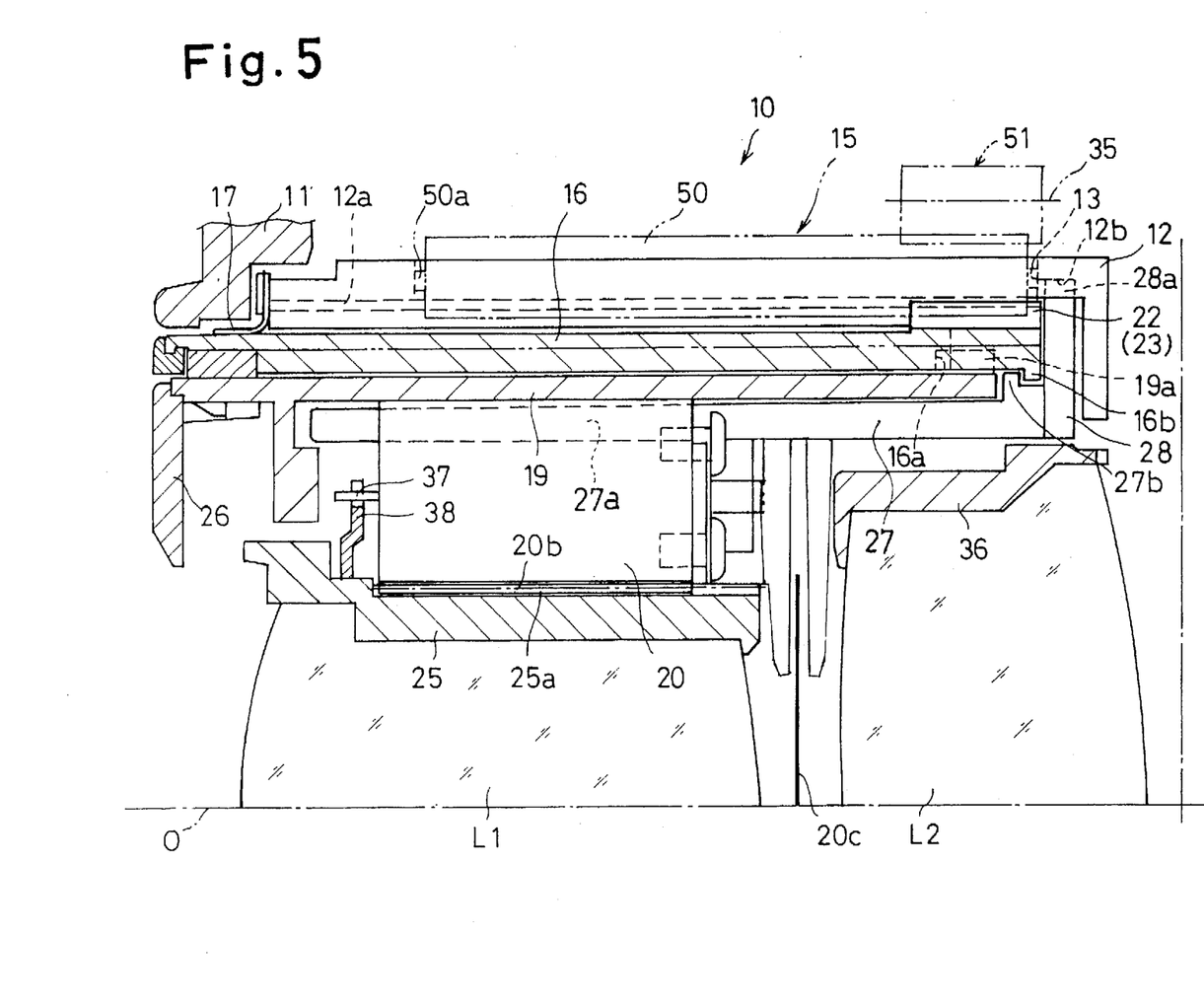
FIG. 5 is a sectional view of an upper half of a zoom lens barrel which is made of the first movable lens barrel shown in FIGS. 3 and 4, with respect to an optical axis.

As can be seen in FIG. 5, a zoom lens barrel 10, according to the present invention, is comprised of two movable lens groups, i.e., a first movable lens group L1 and a second movable lens group L2. In the zoom lens barrel 10, the zooming operation is carried out by moving the first and second lens groups L1 and L2 along a predetermined loci, and the focusing operation is carried out by moving only the first lens group L1 without moving the second lens group L2. For the zooming operation the second lens group L2 is moved by a driving mechanism (not shown).

A stationary block 11, secured to the camera body, is provided with a stationary ring (outer annular member) 12 secured thereto by a known securing means (not shown). The stationary ring 12 is provided with a predetermined width of an elongated gear fitting groove 13 which extends in the optical axis direction. The stationary ring 12 is provided on the front end thereof with an annular light intercepting film 17 whose front end is oriented toward the inner periphery. The light intercepting film 17 is flexible and comes into sliding contact with the outer peripheral surface of a first movable lens barrel 16 (cylindrical mold) which is inserted in the inner periphery of the stationary ring 12 to rotate and move in the optical axis direction to optically intercept light in the gap between the stationary ring 12 and the first movable lens barrel 16.

The stationary ring 12 rotatably supports a shaft 50a of an elongated rotation transmitting gear 50 which is inserted in the gear fitting groove 13. The length of the transmitting gear 50 corresponds to at least the displacement of the first movable lens barrel 16 in the optical axis direction. The stationary block 11 rotatably supports a drive pinion 51 through a shaft 35 so that the pinion 51 is in mesh with the rear end of the transmitting gear 50 which is exposed outside from the stationary ring 12. The drive pinion 51 is rotated by a drive motor (not shown) provided in the camera body, so that the rotation of the drive pinion is transmitted to the transmitting gear 50.

The first movable lens barrel 16 is provided, on the outer peripheral surface of the rear end thereof, with a multiple thread (male screw) 22 and an outer peripheral gear 23. The male screw 22 is engaged by a multiple thread (female screw) 12a provided on the inner peripheral surface of the stationary ring 12. The outer peripheral gear 23 is provided with a plurality of threads (one thread corresponds to a group of teeth 23a parallel with the optical axis O) which are inclined in the same direction as the threads of the male screw 22. Each thread of the male screw 22 is formed between the threads of the gear 23. The outer peripheral gear 23 is in mesh with the transmitting gear 50, and is formed in the circumferential direction within a range corresponding to the angular displacement of the first movable lens barrel 16 about the optical axis O. In the illustrated embodiment, the five threads of the male screw 22 are cut away within a predetermined range in the circumferential direction of the first movable lens barrel 16, so that the outer peripheral gear 23, consisting of a group of parallel gear teeth 23a parallel with the optical axis O, is formed in the cut-away portion. The teeth 23a of the outer peripheral gear 23 are continuously connected in the circumferential direction of the first movable lens barrel 16.

A second movable lens barrel 19 is rotatably fitted in the inner peripheral surface of the first movable lens barrel 16. The second lens barrel 19 is provided, on the outer peripheral surface of the rear end thereof, with a plurality of engaging projections 19a that are spaced at an equi-angular distance. The engaging projections 19a are slidably fitted in a spiral cam groove 16a formed in the inner peripheral surface of the first movable lens barrel 16.

The second movable lens barrel 19 is provided on the inner peripheral surface thereof with an annular AF/AE unit 20 having shutter blades 20c at the rear end thereof. The AE/AF unit 20 is provided on the inner peripheral surface thereof with a female helicoid 20b which is engaged by a male helicoid 25a formed on the outer peripheral surface of a lens supporting frame 25 to which the first lens group L1 is secured. The AE/AF unit 20 has a drive pin 37 which is driven in an angle in the circumferential direction in accordance with object distance data. The drive pin 37 is engaged by an association arm 38 which projects in the radial direction of the lens supporting frame 25. Consequently, the lens supporting frame 25 (first lens group L1) is moved in the optical axis direction O in accordance with the angular displacement of the drive pin 37 and the lead of the helicoids 20b and 25a to thereby effect focusing. In addition, the AF/AE unit 20 opens and closes the shutter blades 20c in accordance with luminance data of an object to be photographed.

The second movable lens barrel 19 is provided on the inner peripheral surface thereof with a linear movement guide ring 27 having a linear movement guide rail 27a which is slidably inserted in a guide portion provided between the second movable lens barrel 19 and the AF/AE unit 20.

The linear movement guide ring 27 is provided on the rear end thereof with an outer peripheral flange 27b which projects outward, and the first movable lens barrel 16 is provided on the rear end thereof with an inner peripheral flange 16b that projects inward. The linear movement guide ring 27 is provided on the rear end thereof with a linear movement guide plate 28 secured thereto by a screw (not shown), so that the inner peripheral flange 16b is disposed between the linear movement guide ring 27 and the outer peripheral flange 27b. The linear movement guide plate 28 has a plurality of engaging projections 28a that project in radial and outward directions. The engaging projections 28a are slidably engaged in a linear movement guide groove 12b formed in the inner peripheral surface of the stationary ring 12 to restrict the relative rotation of the linear movement guide ring 27 with respect to the stationary ring 12.

With this arrangement, the first movable lens barrel 16 is movable together with the linear movement guide ring 27 and the linear movement guide plate 28 in the optical axis direction O; and is rotatable relative to the linear movement guide ring 27 and the linear movement guide plate 28. The second movable lens barrel 19 is not rotatable relative to the stationary ring 12 and is linearly movable in the optical axis direction O. The second movable lens barrel 19 is linearly moved in the optical axis direction O by engaging the engaging projections 19a in the cam groove 16a of the first movable lens barrel 16.

The lens supporting frame 36, which holds the second lens group L2, has a guide pin (not shown) which is engaged in a predetermined profile of the cam groove formed in the inner peripheral surface of the first movable lens barrel 16. Consequently, the lens supporting frame 36 (second lens group L2) is reciprocally moved in the optical axis direction O while keeping a predetermined relationship between the first lens group L1, during the rotation of the first movable lens barrel 16. Note that 26 in FIG. 5 designates the lens covering cylinder provided at the front end of the second movable lens barrel 19.

The first movable lens barrel 16 and the molding process therefor, according to the present invention will now be discussed below.

Figure 7:
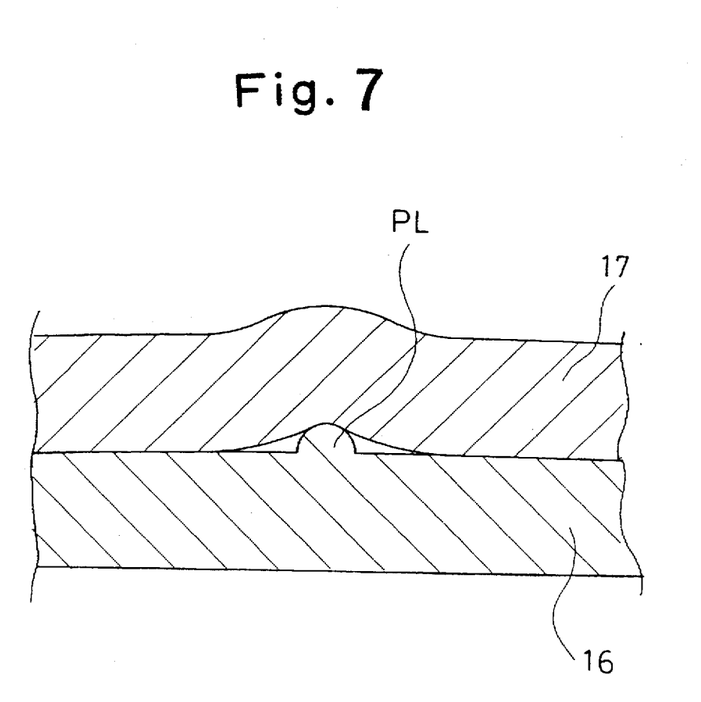

When the first movable lens barrel 16 is molded using a conventional molding die assembly, if a parting line PL of certain height is produced on the outer peripheral surface to extend in a parallel direction with the optical axis direction, the light intercepting member 17 is partly deformed or deflected by the parting line PL, as shown in FIG. 7, so that a gap is formed between the light intercepting member 17 and the first movable lens barrel 16. Since the parting line PL extends parallel with the optical axis O, the gap caused by the deformation or deflection of the light intercepting member 17 continuously extends in a direction parallel to the optical axis O. In this state, if light is made incident upon the lens from the front, the light partly enters the lens through the gap, thus resulting in a less reliable photographing operation.

Figure 3:
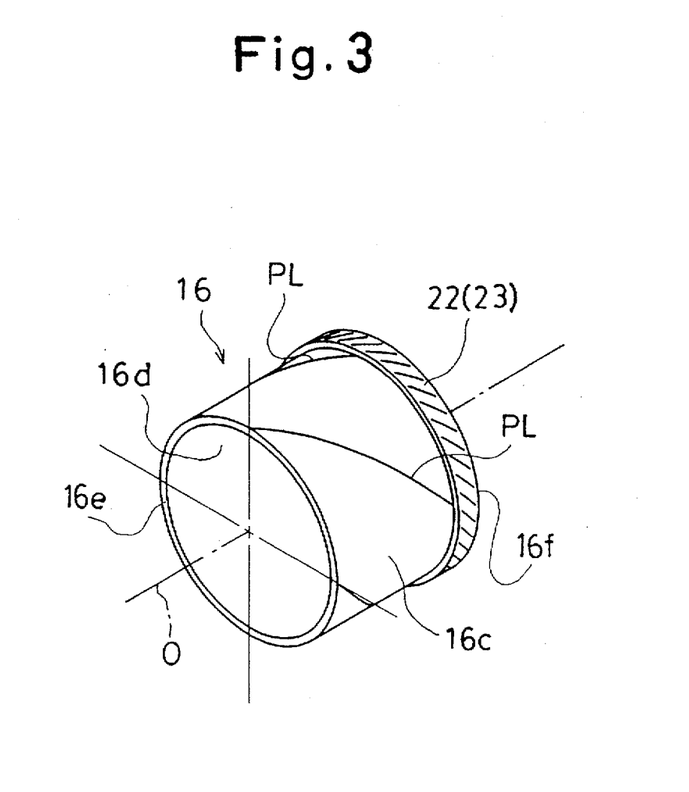
FIG. 3 is a perspective view of a first movable lens barrel produced by the molding die assembly shown in FIGS. 1 and 2.
Figure 4:
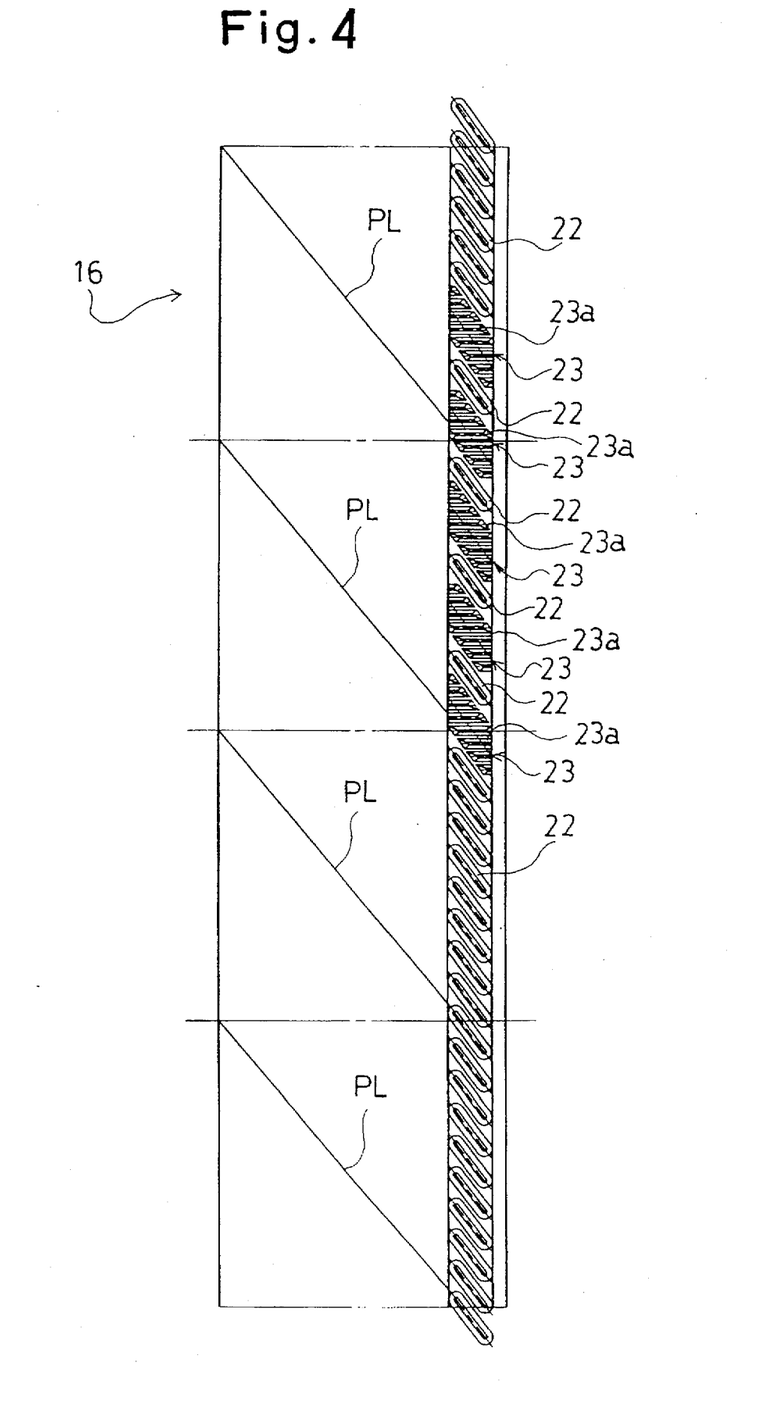
FIG. 4 is a developed view of the first movable lens barrel shown in FIG. 3.

To solve this problem, according to the basic concept of the present invention, the parting line is spiral with respect to the optical axis O, so that direct light from the object side can be certainly intercepted; and, in addition to the foregoing, not only light entering in the spiral direction (lead direction) hardly becomes direct light, in view of the fact that the lens barrel is cylindrical, but also no or little light can reach the inside of the lens barrel since the gap is also curved. Namely, according to the present invention, the first movable lens barrel 16 is made of synthetic resin and has a parting line PL which is formed on the portion of the outer peripheral surface 16c thereof (excluding the male screw 22 and the outer peripheral gear 23), as can be seen in FIG. 3. The parting line PL is produced by the molding die assembly 30, which will be discussed below, and is inclined with respect to the circumferential and axial directions to exhibit a spiral or helical shape with respect to the optical axis O. Note that the parting line PL extends to a direction parallel to the direction of teeth of the male screw 22.

Figure 1:
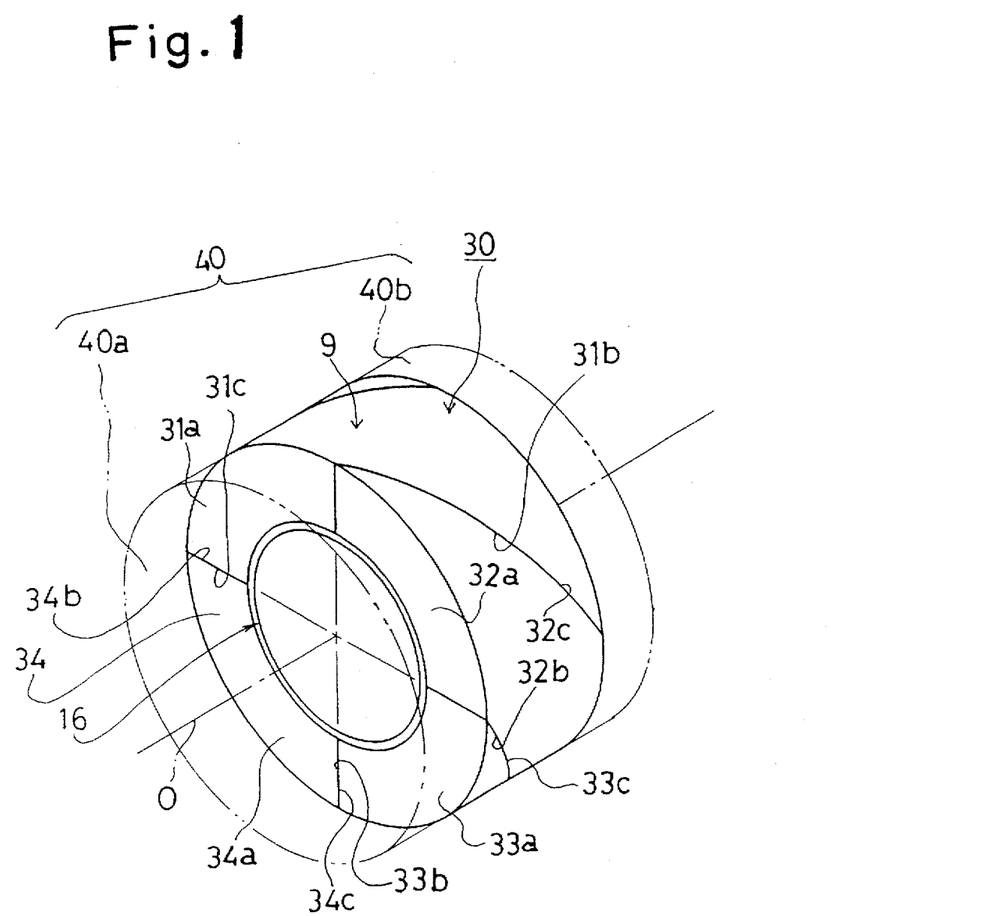
FIG. 1 is a perspective view of a molding die assembly which is used to mold a first movable lens barrel according to the present invention.
Figure 2:
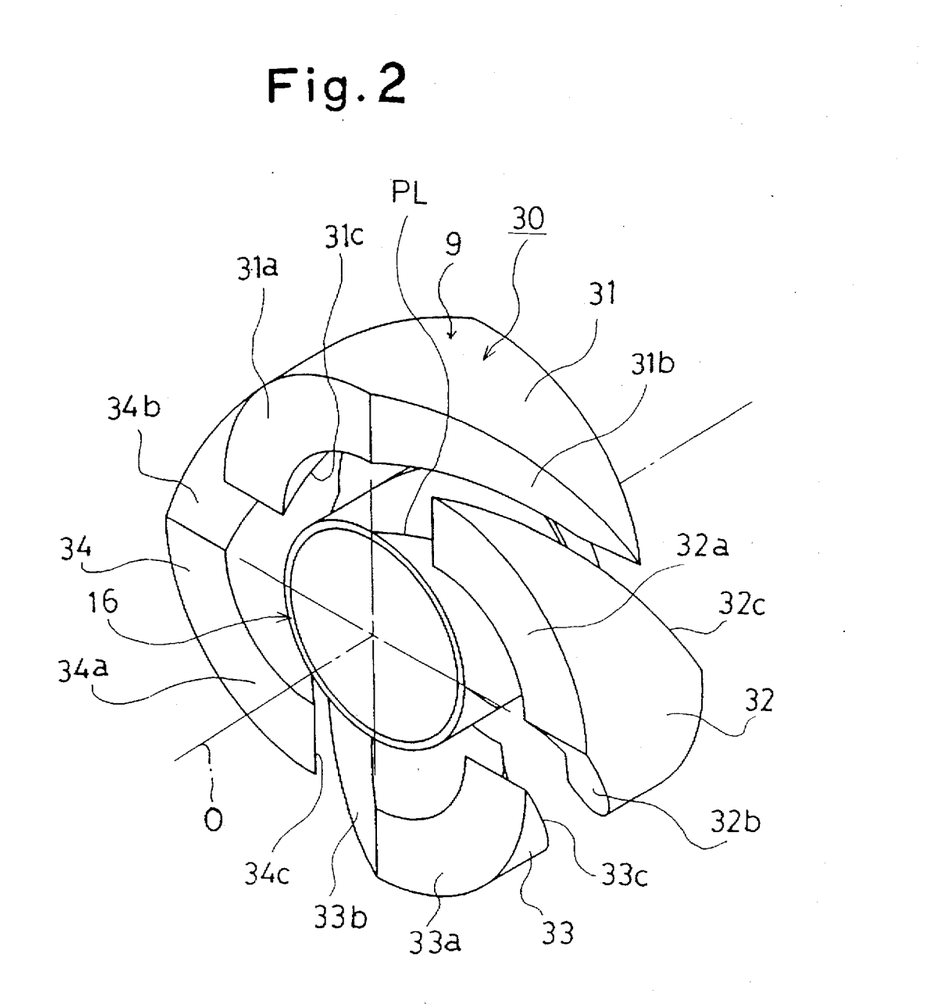
FIG. 2 is a perspective view of a molding die assembly shown in a disassembled state.

The molding die assembly 30 is comprised of an outer die 9 which is adapted to form an outer peripheral surface 16c of the first movable lens barrel 16, and an inner die 40 which is adapted to form the inner peripheral surface 16d, the front end surface 16e and the rear end surface 16f. The inner die 40 includes a die portion 40a which is located in front of the outer die 9, a die portion 40b which is located at the back of the outer die 9, and a die portion (not shown) which is located on the inner peripheral surface side of the outer die 9 to define a predetermined gap between the same and the inner peripheral surface of the outer die 9, when the inner die 40 is assembled with the outer die 9 in a predetermined state. The outer die 9 is in the form of a cylinder whose inner diameter is identical to the outer diameter of the first movable lens barrel 16. The outer die 9 is comprised of four split die elements 31, 32, 33 and 34 which are split at an equi-angular distance with respect to the optical axis O, so that the molded product can be removed (first movable lens barrel 16).

The split die elements 31, 32, 33 and 34 are provided with abutting surfaces 31a, 32a, 33a, and 34a which come into contact with the inner die 40 and can be split at separating surfaces 31b, 31c, 32b, 32c, 33b, 33c, 34b and 34c which are inclined with respect to the circumferential direction and the optical axis direction O. The connecting surfaces of the separating surfaces 31b, 31c, 32b, 32c, 33b, 33c, 34b and 34c exhibit, at the inner peripheral side, a spiral shape inclined with respect to the circumferential direction and the optical axis direction O. Consequently, the parting line PL which is formed on the outer peripheral surface 16c of the first movable lens barrel 16 molded by the molding die assembly 30 is spirally or helically curved with respect to the circumferential and axial directions.

The first movable lens barrel 16 is produced using the molding die assembly 30 as will now be described.

To begin with, the outer die 9 consisting of the split die elements 31, 32, 33 and 34, assembled as shown in FIG. 1, and the inner die 40 are assembled in a predetermined state to define a molding cavity for forming the first movable lens barrel 16.

In this state, a synthetic resin material is introduced to the molding cavity. When the synthetic resin has set, after a predetermined time has lapsed, the split die elements 31, 32, 33 and 34 of the outer die 9 are split at the separating surfaces 31b, 31c, 32b, 32c, 33b, 33c, 34b and 34c, as shown in FIG. 2. After that, the first movable lens barrel 16 is removed from the inner die 40. The first movable lens barrel 16 thus molded has a spiral parting line PL, on the outer peripheral surface thereof, that is curved with respect to the optical axis direction O and the circumferential direction, as shown in FIG. 3. If the parting line PL has a certain height, direct light entering from the object side can be effectively interrupted, since it spirally extends. Moreover, since the first movable lens barrel 16 is cylindrical, no or little direct light can enter in the lead direction. Furthermore, since a gap, produced due to the parting line around the first movable lens barrel and the outer or inner ring associated therewith, is also curved along the parting line, no light tends to enter the lens barrel. Consequently, a light intercepting member, used to optically interrupt that light inside the gap produced by the parting line can be dispensed with. Thus, a good light intercepting effect can be achieved through the use of only the light intercepting member 17, rendering the use of a special light intercepting member to not be required.

The operation of the zoom lens barrel 10 as constructed above will now be explained.

When the drive motor (not shown) is driven, the rotation of the drive motor is transmitted, to the outer peripheral gear 23 of the first movable lens barrel 16, through the drive pinion 51 and the transmission gear 50. Consequently, the advance of the lens barrel takes place through the screw-engagement between the male screw 22 and the female screw 12a of the stationary ring 12.

When the first movable lens barrel 16 is rotated, the second movable lens barrel 19 having the projections 19a which are engaged in the cam groove 16a formed in the inner peripheral surface of the lens barrel 16, and the lens supporting frame 36 having the guide pin which is engaged in the cam groove of the lens barrel 16, are advanced in the optical axis direction O while keeping a predetermined relationship. Consequently, the first lens group L1 and the second lens group L2 are linearly advanced in the optical axis direction O while changing the spatial distance therebetween to effect the zooming operation.

Upon completion of the zooming, the AF/AE unit 20 drives the drive pin 37 in the circumferential direction by a predetermined angle in accordance with object distance data to advance the first lens group L1 in the optical axis direction to thereby perform the focusing. Also, the AF/AE unit 20 opens and closes the shutter blades 20c at a predetermined time in accordance with luminance data of an object to be photographed.

Figure 6:
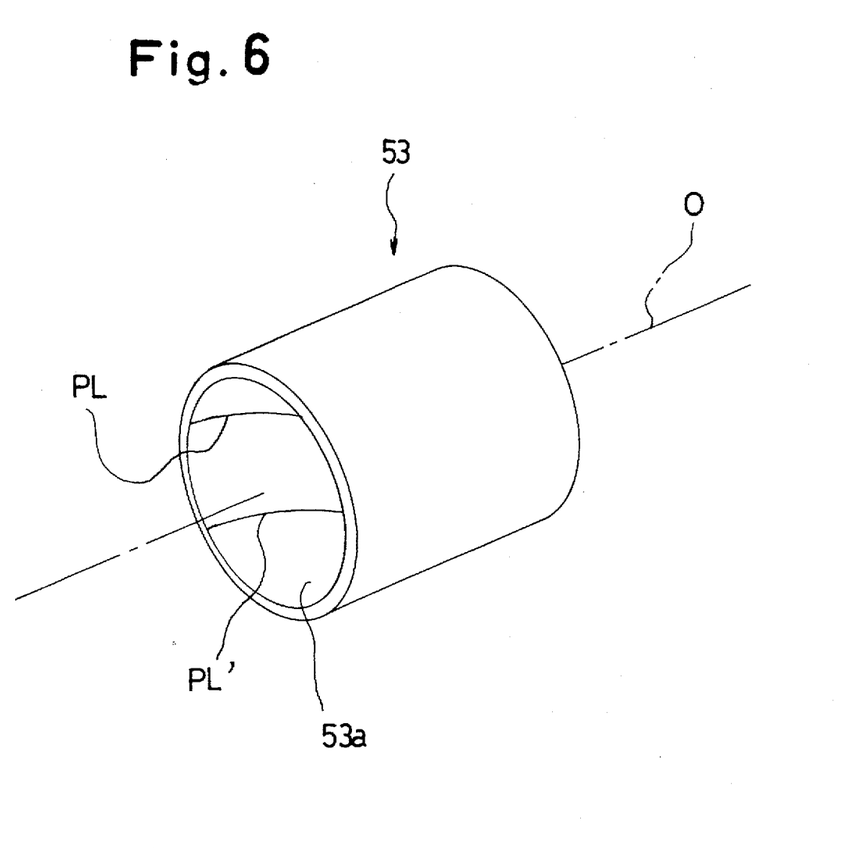
FIG. 6 is a perspective view of a cylindrical body which has a spiral parting line formed on an inner peripheral surface thereof; and, FIG. 7 is an enlarged sectional view of a cylindrical body and a light intercepting film which is deformed by an axially extending parting line of a certain height, so that a clearance is produced between the cylindrical body and the light intercepting film.

Although the above discussion has been directed to an embodiment in which the spiral parting line PL is formed on the outer peripheral surface of the first movable lens barrel 16, the present invention is not limited to the illustrated embodiment. For instance, it is possible to form a spiral parting line PL on the inner peripheral surface of a cylindrical mold 53, using an inner die 40 which is comprised of split die elements similar to the outer die 9, as shown in FIG. 6.

Consequently, a light intercepting member used to optically interrupt the gap produced by the parting line is not necessary. Thus, a good light interruption can be established between the cylindrical body and an annular member provided on the inner peripheral surface thereof by the use of only the light intercepting member, rendering the use of a special light intercepting member to not be required.

As can be understood from the above discussion, according to the present invention, if a cylindrical mold is used for, for example, a lens barrel for a zoom camera, there is no leakage of light through and between the cylindrical mold and an inner or outer ring located on the inner or outer peripheral surface of the cylindrical mold, when a light intercepting member is provided, even without the provision of a special light intercepting member.

Although the invention has been described with reference to particular means, materials and embodiments, it is to be understood that the invention is not limited to the particulars disclosed and extends to all equivalents within the scope of the claims.

We claim:

1. A molding die assembly for molding a cylindrical lens barrel of a camera, comprising:

an outer molding die for forming an outer peripheral surface of said cylindrical lens barrel;

an inner molding die for forming an inner peripheral surface of said cylindrical lens barrel; and said outer molding die comprising a plurality of split die elements, said plurality of split die elements being split to form at least one oblique separating surface inclined with respect to circumferential and axial directions of said cylindrical lens barrel.

2. A molding die assembly according to claim 1, wherein when said split die elements are connected at said oblique separating surface, a cylindrical shape is formed.

3. A molding die assembly according to claim 1, said inner molding die comprising a plurality of split die elements, said plurality of split die elements are split to form at least one oblique separating surface inclined with respect to circumferential and axial directions of said cylindrical lens barrel.

4. A molding die assembly for molding an article having an outer peripheral surface, comprising:

a plurality of split die elements for forming an outer peripheral surface of said article;

a plurality of oblique separating surfaces provided on each of said split die elements, said oblique separating surfaces being inclined with respect to circumferential and axial directions of said article, said oblique separating surfaces extending parallel to each other in a developed view of said outer-molding of split die elements; and said split die elements forming an inner cylindrical shape when connected at the oblique separating surface, said inner cylindrical shape being the same as the outer peripheral surface.

5. A molding die assembly for molding a circular article having an outer peripheral surface, comprising:

a plurality of split die elements for forming an outer peripheral surface of said article;

a plurality of oblique separating surfaces provided on each of said split die elements, said oblique separating surfaces being inclined with respect to circumferential and axial directions of said article, said oblique separating surfaces extending parallel to each other in a developed view of said plurality of split die elements; and said split die elements defining an inner cylindrical shape when connected at the oblique separating surfaces, said inner cylindrical shape defining said outer peripheral surface of said article.

* * * * *